UNITED STATES PATENT OFFICE.

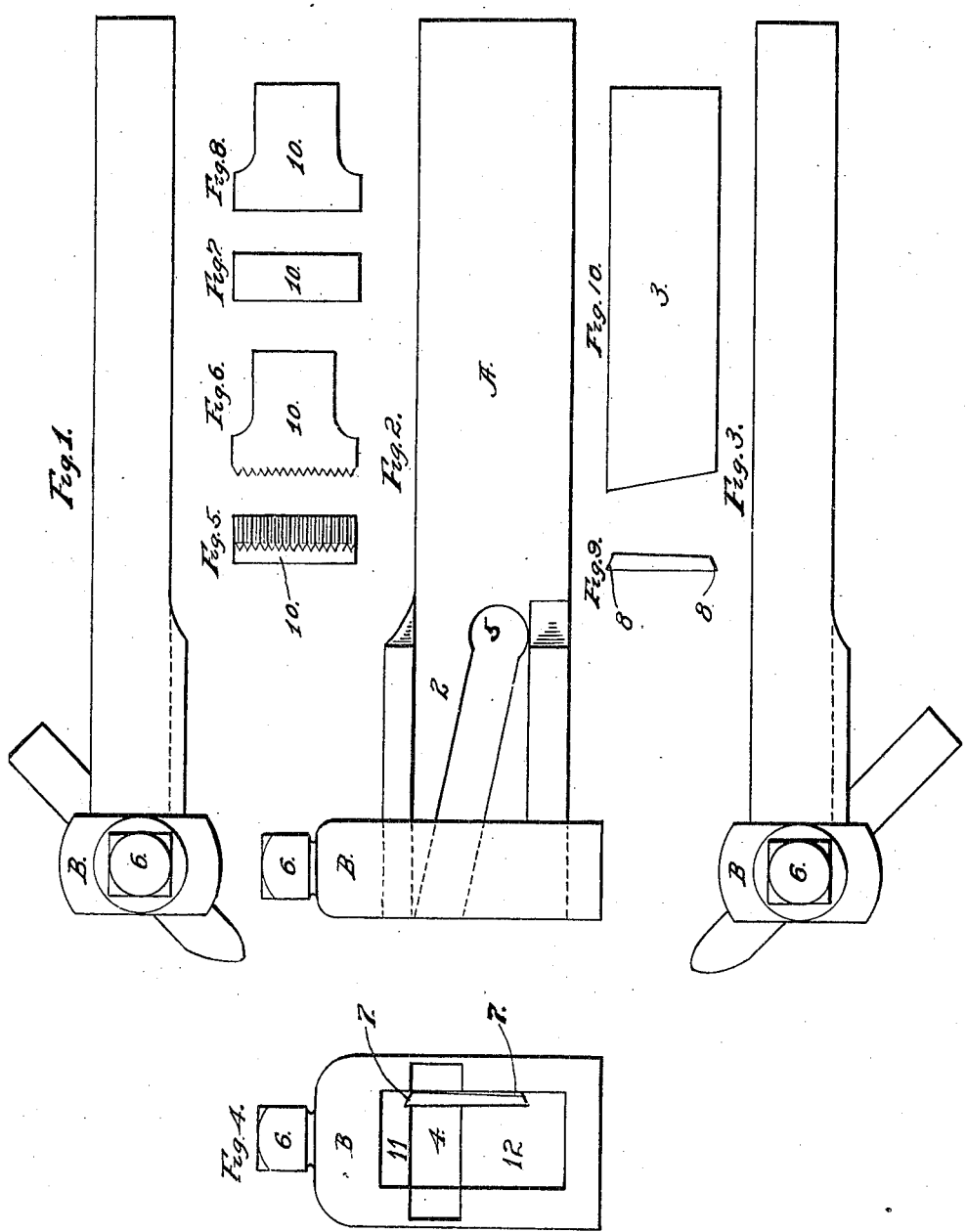

ARTHUR MUNCH, OF ST. PAUL, MINNESOTA.

TOOL-HOLDER.

No. 852,134.　　　　Specification of Letters Patent.　　Patented April 30, 1907.

Application filed November 10, 1905. Serial No. 286,704.

*To all whom it may concern:*

Be it known that I, ARTHUR MUNCH, a citizen of the United States, residing at St. Paul, in the county of Ramsey and State of Minnesota, have invented certain new and useful Improvements in Tool-Holders, of which the following is a specification.

My invention relates to improvements in tool holders for metal working machines, designed for holding metal working and cutting off tools, its object being to provide a construction which will hold the tool more firmly than the ordinary tool holder.

To this end my invention consists in the features of construction and combination hereinafter particularly described and claimed.

In the accompanying drawings forming part of this specification, Figure 1 is a top view of my improved tool holder shown holding a right hand tool; Fig. 2 is a side elevation of the tool holder alone; Fig. 3 is a top view showing a left hand tool; Fig. 4 is an end view of the tool holder; Figs. 5 and 6 are details of a thread-chasing tool; Figs. 7 and 8 are details of a broad nosed tool, and Figs. 9 and 10 are details of a cutting off tool.

In the drawings A represents the shank of the holder formed in one side with a wide shallow groove 2 for receiving the cutting off tool 3. The outer end of the shank is also formed with a transverse diagonal opening or slot 4 formed with an enlarged inner end 5, said groove being adapted to receive the metal working tools shown in Figs. 5 to 8.

B represents a yoke adapted to embrace the shank and provided with a set screw 6 by which the spring sides of the shank are clamped together. As shown in Fig. 2 the wide shallow groove 2 is formed at each end with a cut in portion 7 to receive the adjacent edge 8 of the tool 3. The yoke is cut away upon its sides in line with the transverse opening 4 to permit the tool to be adjusted or placed at an angle, as shown in Figs. 1 and 3.

In use, the cutting off tool is placed in the shallow groove, or the metal working tool in the transverse slot, as the case may be. The upper and lower spring sides 11 and 12 of the end of the shank are then pressed together by means of the set screw 6 to clamp the intermediate tool. A clamping pressure upon the tool is thus secured by the spring of the shank sides instead of by the pressure of the yoke, the sides 11 and 12 thus constituting as it were spring jaws.

I claim:—

A tool holder comprising in combination a shank formed with a transverse tool receiving opening in one end, and with a longitudinally extending groove in one side, a yoke fitted over the end of said shank, and a set screw extending through said yoke and bearing against the adjacent portion of the shank.

In testimony whereof I affix my signature in presence of two witnesses.

ARTHUR MUNCH.

Witnesses:
　H. S. JOHNSON,
　EMILY F. OTIS.